United States Patent [19]

Ehlinger

[11] Patent Number: 5,298,163
[45] Date of Patent: Mar. 29, 1994

[54] PROCESS FOR THE TREATMENT OF EFFLUENTS

[75] Inventor: Frédéric Ehlinger, Le Pecq, France

[73] Assignee: Degremont, Rueil Malmaison Cedex, France

[21] Appl. No.: 984,286

[22] Filed: Dec. 1, 1992

Related U.S. Application Data

[63] Continuation of Ser. No. 580,548, Sep. 11, 1990, abandoned.

[30] Foreign Application Priority Data

Sep. 14, 1989 [FR] France .................. 89 12047

[51] Int. Cl.$^5$ .................................. C02F 3/28
[52] U.S. Cl. ........................... 210/603; 210/631
[58] Field of Search ............ 210/603, 614, 630, 631, 210/605, 629, 621

[56] References Cited

U.S. PATENT DOCUMENTS

| | | | |
|---|---|---|---|
| 4,351,729 | 9/1982 | Witt | 210/603 |
| 4,384,956 | 5/1983 | Mulder | 210/603 |
| 4,966,704 | 10/1990 | Särner | 210/603 |

FOREIGN PATENT DOCUMENTS

| | | |
|---|---|---|
| 2461684 | 6/1980 | France . |
| 2484990 | 6/1980 | France . |

OTHER PUBLICATIONS

Chemical Abstracts, vol. 107, No. 10, Sep. 7, 1987, p. 343 V. E. Gubin et al, "Biochemical Treatment of Sulfate-Containing Wastewater".

Chemical Abstracts, vol. 111, No. 22, Nov. 27, 1989, p. 392 J. P. Maree et al. "Biological Process for Sulfate Removal from Industrial Effluent".

Chemical Abstracts, vol. 108, No. 22, May 30, 1988, p. 349 B. L. Hilton et al. "A Comparison of Anaerobic Reactors Operating with and without the Addition of Sulfates".

B. Dasu, "Reduction of Sulfur Dioxide by Desulfovibrio Desulfuricans in Co-culture with Fermentative Heterotrophs," published by Biotechnology and Bioengineering, vol. 34, pp. 405-409 (1989).

A. Middelton, "Kinetics of Microbial Sulfate Reduction," J. Wat. Pollut. Control Federation, Jul. 1977, pp. 1659-1970.

*Primary Examiner*—Thomas Wyse
*Attorney, Agent, or Firm*—Pollock, Vande Sande & Priddy

[57] ABSTRACT

A process for the treatment, using anaerobic fermentation, of effluents, with a view to the removal of the organic matter and of the sulfates which they contain, carried out by means of a single reactor into which is introduced, within the biomass which it contains, a neutral gas intended to displace the $H_2S$ formed, in which the reactor employed is a free-culture, infinitely mixed reactor.

5 Claims, 1 Drawing Sheet

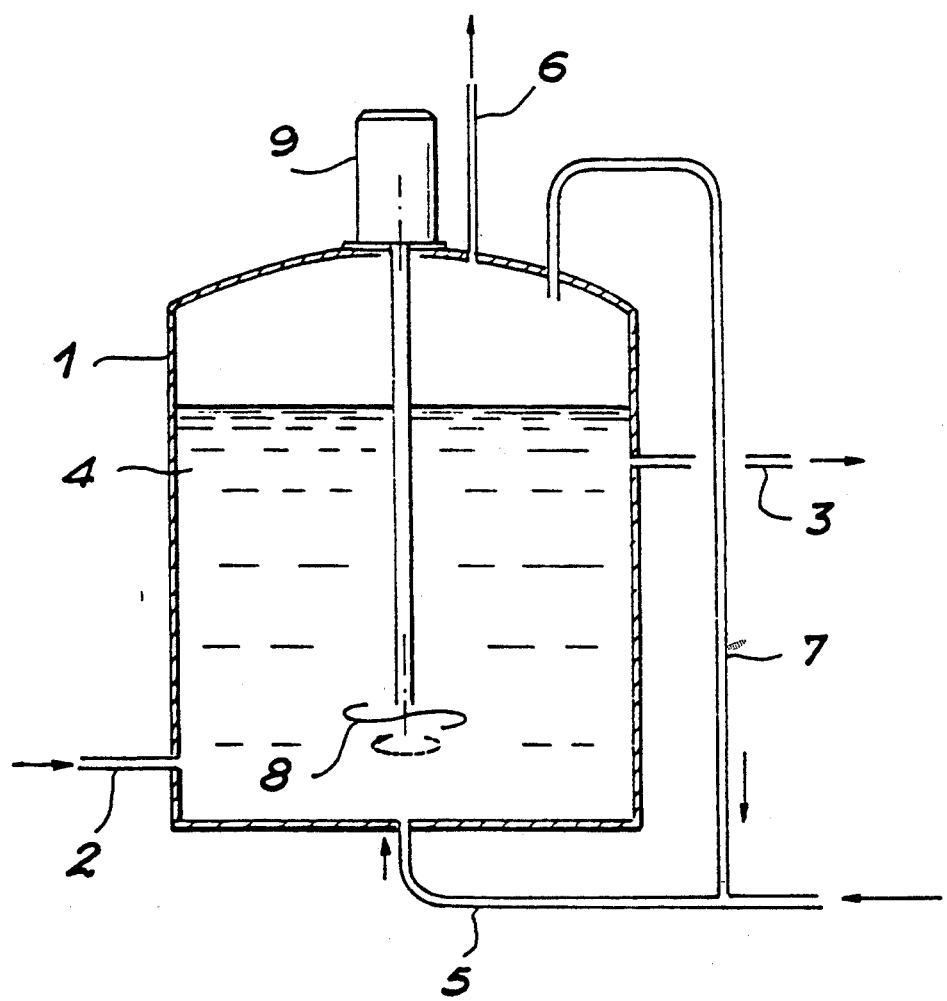

PROCESS FOR THE TREATMENT OF EFFLUENTS

This application is a continuation of Ser. No. 07/580,548 filed on Sep. 11, 1990, abandoned.

BACKGROUND OF THE INVENTION

The present invention relates to a process for the treatment, using anaerobic fermentation, of effluents with a view to the removal of the organic matter and of the sulfates which they contain.

The degradation of the organic matter present in effluents using anaerobic fermentation is performed by a complex ecosystem whose final stage is a fermentation resulting in the production of methane; the efficiency of the purification to which these effluents are thus subjected depends, therefore, in particular on the effectiveness of this last stage.

The ecosystem consists of a mixture of commensal bacterial genera whose food chain consists of the organic matter, and this results in its progressive destruction. Three separate stages can be distinguished, these being generally simultaneous in the treatment plant, where the various microbial genera coexist simultaneously with matter in various stages of its degradation.

In a first stage, the complex molecules are hydrolyzed into simpler molecules called volatile fatty acids (or VFA) such as tactic acid, acetic acid, propionic acid or butyric acid.

The second stage, called acetogenesis, corresponds to the conversion of these higher organic acids into acetic acid. This stage, carried out by so-called acetogenic bacteria, produces hydrogen and carbon dioxide.

The third stage is the methanization in which the residual metabolites are converted into methane by methanogenic bacteria of two distinct species, one employing the hydrogen and the carbon dioxide, the other, so-called acetoclasts, employing acetic acid.

When, as is frequently the case, the effluents additionally contain sulfates, a so-called sulfate-reducing flora develops in their presence; it produces hydrogen sulfide ($H_2S$) and perturbs the operation of the purifying ecosystem in the following manner:

during the second stage the sulfate-reducing bacteria consume a proportion of the VFA, to the cost of the acetogenics, that is to say of the production of acetic acid and hence of methane. In addition, the $H_2S$ produced inhibits the behavior of the acetogenics with the result that a proportion of the VFAs can escape degradation and remain in the liquid left at the end of the treatment;

sulfate-reducing bacteria are also harmful in the third stage, firstly because it consumes hydrogen and carbon dioxide to the disadvantage of the methanogens, and secondly in that the $H_2S$ produced inhibits the behavior of the acetoclastic bacteria.

The presence of sulfates in the effluents intended to be purified by fermentation to methane consequently presents the risk of limiting the performance of the biological reactors in which this fermentation takes place.

Prior Art

The inhibition phenomena can be avoided physically by isolating the most sensitive stage, that is to say that of formation of methane, from the other stages. To this end, the biological conditions needed to produce the various stages are created in two separate reactors.

Thus, document FR-A-2,484,990 relates to a process which makes it possible to reduce the free $H_2S$ content in a digester. The removal of $H_2S$ takes place in structures, either by starting with the fermentation gas or by starting with the treated effluent leaving the reactor. After the removal of the $H_2S$, the purified effluent is partially recycled to the reactor. In the process according to this patent the acid formation, sulfate reduction and methanogenesis stages take place within a single reactor and simultaneously.

Document GB-A-2,143,810 describes an anaerobic process intermediate between a sludge bed or expanded bed and a fixed film bed. It recommends a stagewise removal of $H_2S$. On the one hand, the effluent leaving the reactor is freed from $H_2S$ by stripping in an external column swept by an inert gas. On the other hand, the reactor itself must be swept by this inert gas, and this creates the risk of perturbing the stability of the biomass bed and makes it difficult to control the operation of the reactor. In addition, this stagewise stripping penalizes the economic balance of the industrial plant.

Finally, according to document EP-0,241,999, it has already been proposed to perform the anaerobic fermentation by successively passing the effluent through two fixed-culture reactors. The acidification takes place in the first reactor and is coupled with the biological reduction of the sulfates. The effluent leaving the first reactor is freed from $H_2S$ by stripping with an inert gas in an intermediate structure before entering the second reactor.

However, according to the document, the pH must be controlled between 6.5 and 6.7 so as to promote the sulfate reduction and the $H_2S$ stripping. However, pH control in an industrial plant is costly and difficult to optimize, above all in the case where sulfuric acid is employed for this purpose, which further increases the sulfate content.

SUMMARY OF THE INVENTION

It has been found, in an absolutely surprising manner, that if, in accordance with the invention, the fermentation was conducted in a single free-culture, infinitely mixed reactor, with displacement of the $H_2S$ formed by means of a neutral gas introduced into the reactor within the biomass, the pH of the medium stabilized itself in the region of neutrality and was even self-regulating around 6.9 and the degree of reduction of the sulfates stabilized itself in the region of 80% - whereas, when the known processes were applied, the pH varied within large limits and the degree of conversion of the sulfates did not exceed 50%.

DESCRIPTION OF THE DRAWING

As shown by the single figure of the attached drawing, the process according to the invention can be implemented by means of a reactor consisting of an enclosure 1 to which the effluent to be treated is delivered by a conduit 2 and which it leaves, purified, via the conduit 3.

The biomass 4 is in the form of a free culture.

A neutral gas is introduced into the enclosure 1, within the biomass 4 via a conduit 5, the gaseous phase produced being removed at 6, with a possibility of partial recycling by means of the conduit 7 connected into the conduit 5.

The biomass is stirred continuously by virtue of the gas introduced within it, and of a suitable device driven by a motor 9. The stripping of $H_2S$ directly in the reactor 1 by injection of an inert gas within the biomass, in accordance with the invention, causes a rise in the pH which, on the one hand, does not harm the displacement of the $H_2S$ from the liquid phase towards the gaseous phase and, on the other hand, promotes the activity of the sulfate-reducing bacteria and hence the removal of sulfates.

When operating in accordance with the invention, the removal of $H_2S$ not only causes a rise in the pH, but also, as a consequence, makes it possible to obtain a degree of reduction of sulfates of 80%, whereas it is never higher than 50%.

In addition, by virtue of the process according to the invention, it is unnecessary to control the pH in the reactor, because this pH regulates itself in the region of neutrality and sulfide concentrations of less than 100 mg/l are obtained in the reactor.

What is claimed is:

1. A process for the treatment, using anaerobic fermentation, of effluents, for the removal of both the organic matter and of the sulfates contained therein, carried out by means of a single reactor into which is introduced, within the biomass, contained in said single reactor a neutral gas for displacing the $H_2S$ formed, and wherein the reactor employed is a free-culture, infinitely mixed reactor; wherein the pH is self regulated at around 6.9; and wherein no methane is produced in said single reactor.

2. The process as claimed in claim 1, wherein the displaced $H_2S$ is partially recycled in the neutral stripping gas.

3. The process as claimed in claim 1, wherein the biomass is kept stirred by the neutral gas which is introduced therein.

4. The process as claimed in claim 1 wherein sulfide concentrations of less than 100 mg/l are obtained in the reactor.

5. The process of claim 1 wherein the degree of reduction of sulfates in the region of 80%.

* * * * *